United States Patent [19]
Blitz et al.

[11] Patent Number: 5,170,267
[45] Date of Patent: Dec. 8, 1992

[54] RASTER INPUT SCANNER (RIS) WITH DIAGNOSTIC MODE TO PREDICT AND VERIFY ILLUMINATION OPTICAL PERFORMANCE

[75] Inventors: William A. Blitz, Webster; James R. Graves, Ontario; Gerald L. Coy, Rochester, all of N.Y.

[73] Assignee: Xerox Corporation, Stamford, Conn.

[21] Appl. No.: 590,425

[22] Filed: Sep. 28, 1990

[51] Int. Cl.⁵ .............................................. H04N 1/40
[52] U.S. Cl. .................... 358/475; 358/406; 358/481
[58] Field of Search ............ 358/475, 474, 479, 482, 358/461, 406, 465, 443, 446, 448

[56] References Cited

U.S. PATENT DOCUMENTS

| | | | |
|---|---|---|---|
| 3,679,306 | 7/1972 | DuBois et al. | 355/68 |
| 4,005,940 | 2/1977 | Kidd et al. | 356/172 |
| 4,647,981 | 3/1987 | Froelich | 358/285 |
| 4,751,377 | 6/1988 | Ishizaka et al. | 250/205 |
| 4,796,093 | 1/1989 | Asano | 358/475 |
| 4,853,739 | 8/1989 | Miyamoto et al. | 358/475 |
| 4,862,397 | 8/1989 | Pryor | 364/571.01 |
| 4,876,605 | 10/1989 | Ishikawa et al. | 358/464 |
| 4,961,117 | 10/1990 | Rumley | 358/461 |

Primary Examiner—Stephen Brinich
Assistant Examiner—Jerome Grant, II

[57] ABSTRACT

A diagnostic test process is provided for a visual verification of the spatial illumination characteristics of an illumination system used in a raster input scanner (RIS) system. A calibration reference strip is illuminated by the RIS scanning lamp and the reflected image is detected by a photosensor array. The output data from the photosensor is sampled at predetermined time intervals with each sampling being displayed as a video illumination profile at a display screen. The profile is superimposed on a calibration grid with indicia which allow verification that the lamp calibration is still valid. An out of spec calibration display prompts an operator or tech rep to initiate a recalibration routine or to replace the lamps or possibly clean the optical system components.

10 Claims, 5 Drawing Sheets

RASTER INPUT SCANNER (RIS) WITH DIAGNOSTIC MODE TO PREDICT AND VERIFY ILLUMINATION OPTICAL PERFORMANCE

BACKGROUND OF THE INVENTION

This invention relates to an electronic copying system wherein a raster input/scanner (RIS) is used to scan an original document and more particularly, to a diagnostic process for predicting and verifying the performance of the illumination lamp used to incrementally illuminate the document during scan.

Raster input scanners (RIS) systems have become a scanner of choice for electrophotographic and desk top printers. Typically, the RIS comprises a linear or two dimensional array of photosensors mounted in optical alignment with a through lens or a linear leans array. A document is illuminated by a linear light source and a line-by-line scanning function is accomplished by the RIS with the image being detected and stored electronically. Outputs from the photosensor array may be sent to a raster output scanner (ROS) which forms a modulated output pattern on a charged photoreceptor device or belt. Alteratively, the output may be used to drive other image-forming devices such as conventional light lens copiers, ink jet printers and the like or may be sent to a remote location to be stored, for example, in a data processor.

A significant problem with RIS scanners, manifested by degradation of output prints, is variations in the spatial illumination at the image (photosensor) plane. At initial lamp to photosensor calibration, an optimum lamp illumination profile is generated, but this profile changes as the lamp ages, or as the optical system becomes contaminated, causing undesirable variations in the light sensed by the exposed photosites of the photosensor array. Various techniques are known in the prior art for detecting and adjusting for variations in lamp intensity in a scanning system.

U.S. Pat. No. 4,751,377 to Ishizaka et al. discloses a light beam scanning recording apparatus wherein a test pattern is scanned and used to correct a lamp's intensity. (See FIG. 6). U.S. Pat. No. 4,647,981 to Froelich, assigned to Xerox Corporation, discloses an automatic white level control for a RIS wherein a calibration strip is scanned to calibrate a scanner. A closed-loop type circuit is shown which ensures correct calibration. U.S. Pat. No. 3,679,306 to DuBois et al. discloses a feedback system for controlling image light energy wherein a target is imaged and used to control a motor's speed. See Col. 3, lines 29-56. The motor's speed is altered to account for lamp voltage variations, lamp aging and dirty optics. U.S. Pat. No. 4,862,397 to Pryor discloses a remote operation of an optical system wherein a lamp's intensity can be tested and adjusted over a phone line. See Col. 3, lines 13-29. The system has a diagnostic program which detects differences between various components. See Col. 3, line 50-Col. 4, line 6. U.S. Pat. No. 4,005,940 to Kidd et al., assigned to Xerox Corporation, discloses an optical system alignment apparatus wherein a calibration strip is scanned to test for optical misalignment. Data generated from the calibration strip is used to correct the error. See Col. 7, lines 1-37.

Except for the Froelich patent, the prior art solutions are in the context of a light ones rather than a RIS scanning system. Electronic scanning systems have a greater potential for improving the verification and calibration of the illumination source because of the added intelligence embodied in the electronic circuitry and software associated with detection and process of the scanned image. The present invention is, therefore, directed to a sampling and data display diagnostic technique whereby the illumination and optical output is sequentially sampled by detecting the illumination output reflected from a calibration strip onto a photosensor array. Illumination profile data is accumulated from each sampling and displayed on a video display screen, to provide a visual representative of the illumination and optical spatial profile variations. If the illumination profile variations come within a specified tolerance range, the initial lamp calibration is still valid. If the lamp's output profile is found to exceed this initial specification a recalibration and/or service procedure can be initiated. More particularly, the invention relates to a diagnostic method for visually checking that the scan illumination lamp in a raster input scanner (RIS) is within preset calibration specifications, including the steps of operating said RIS in a diagnostic mode of operation to scan/illuminate a lamp calibration strip and image the reflected light onto a photosensor array, converting the output of the photosensor array into video signals representative of the illumination output profile of the lamp, and displaying the video signals as to provide a visual indication whether the output profile is within said preset calibration specifications and performs these specifications over time.

DESCRIPTION OF THE INVENTION

Figure 1:
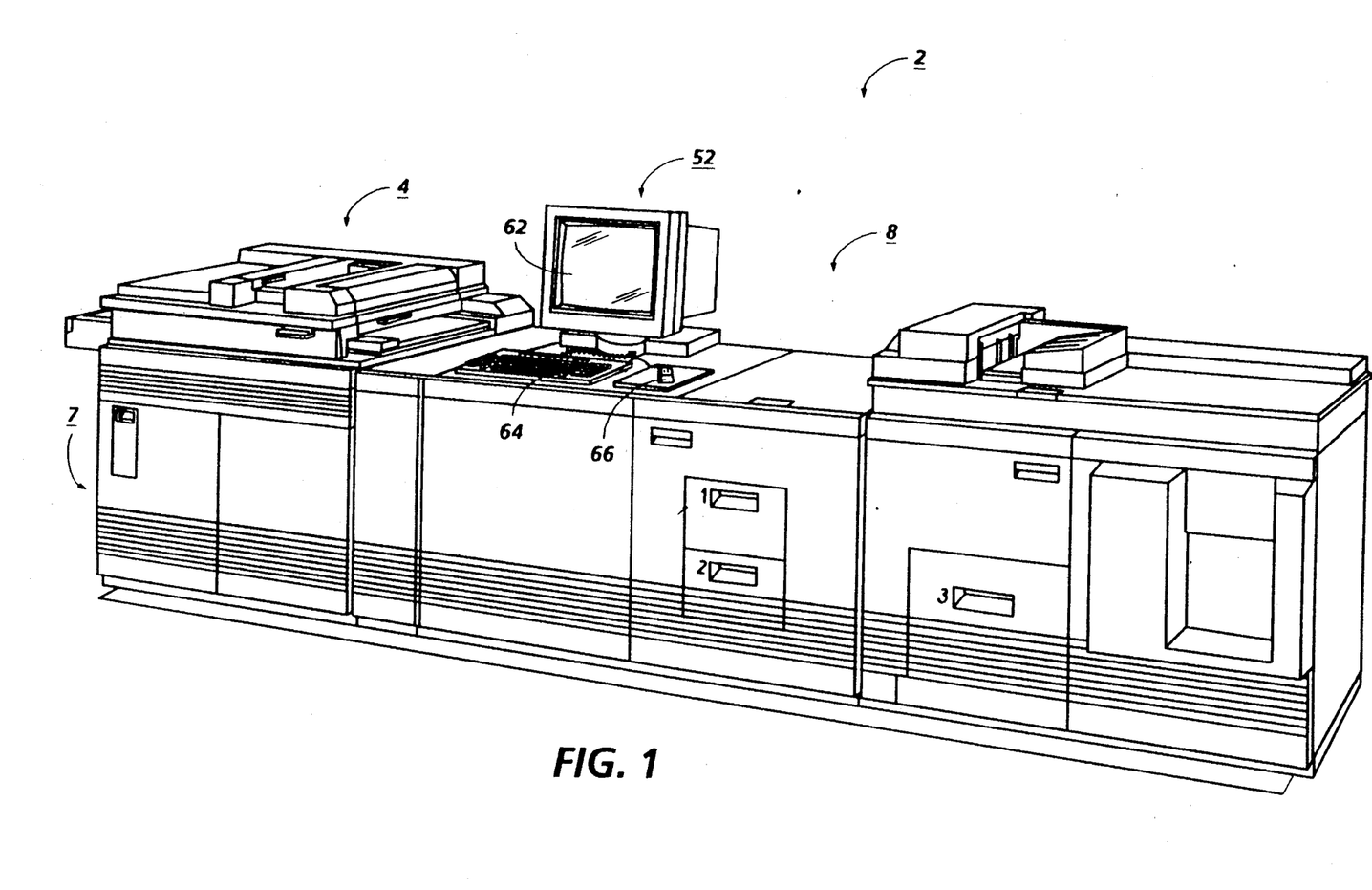
FIG. 1 is a view of an electronic printing system incorporating the RIS illumination diagnostic system of the present invention.
Figure 2:
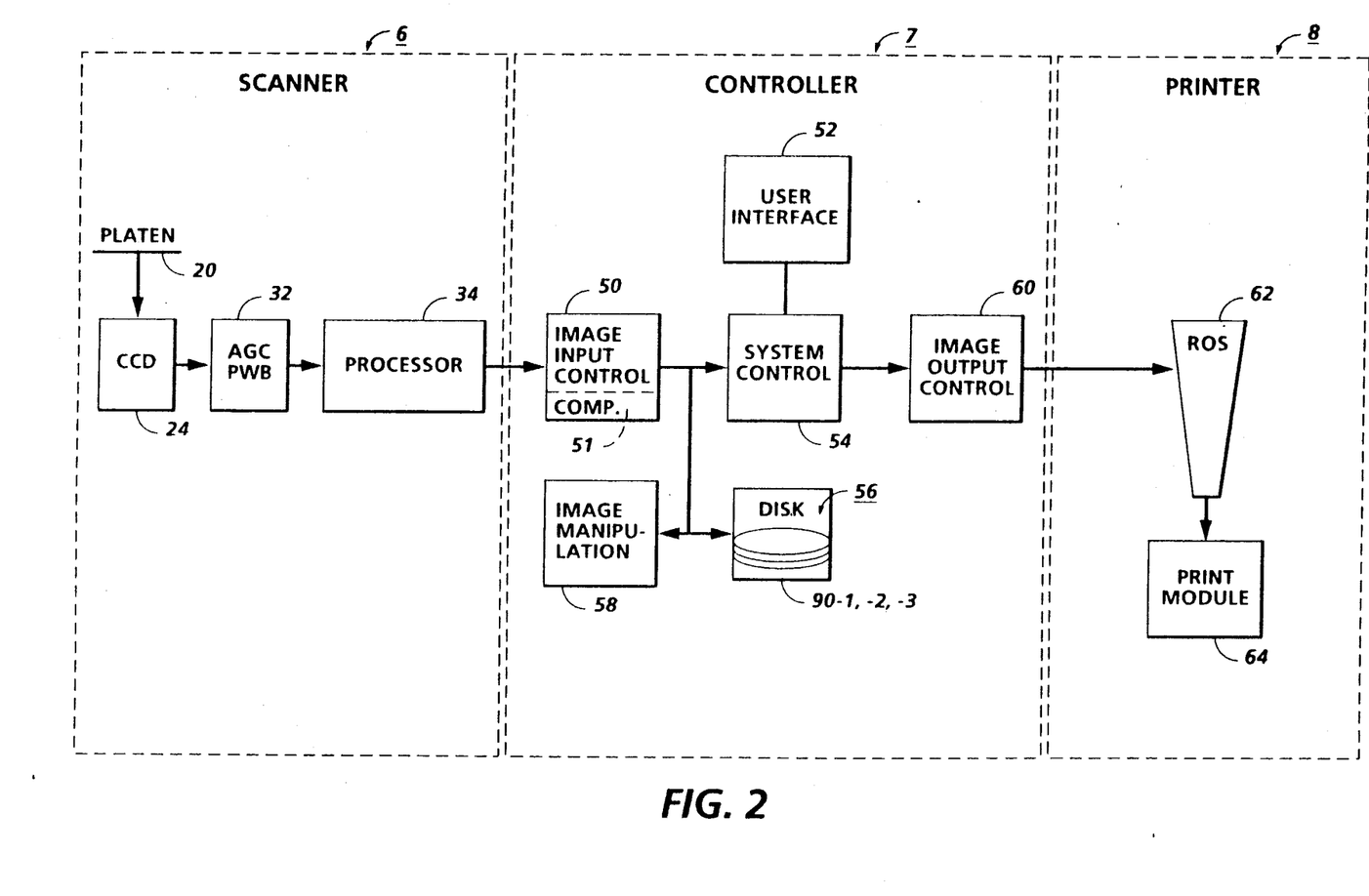
FIG. 2 is a block diagram of the major elements of the printing for the printing system shown in FIG. 1.

Referring to FIGS. 1 and 2, there is shown an exemplary laser based printing system 2 divided into a scanner section 6, controller section 7, and printer section 8. The document illumination control and calibration circuits to be discussed below are associated with scanner section 6. While a specific printing system is shown and described, the present invention may be used with other types of printing systems such as light lens copying onto a photoreceptor, ink jet, ionographic, etc.

Figure 3:
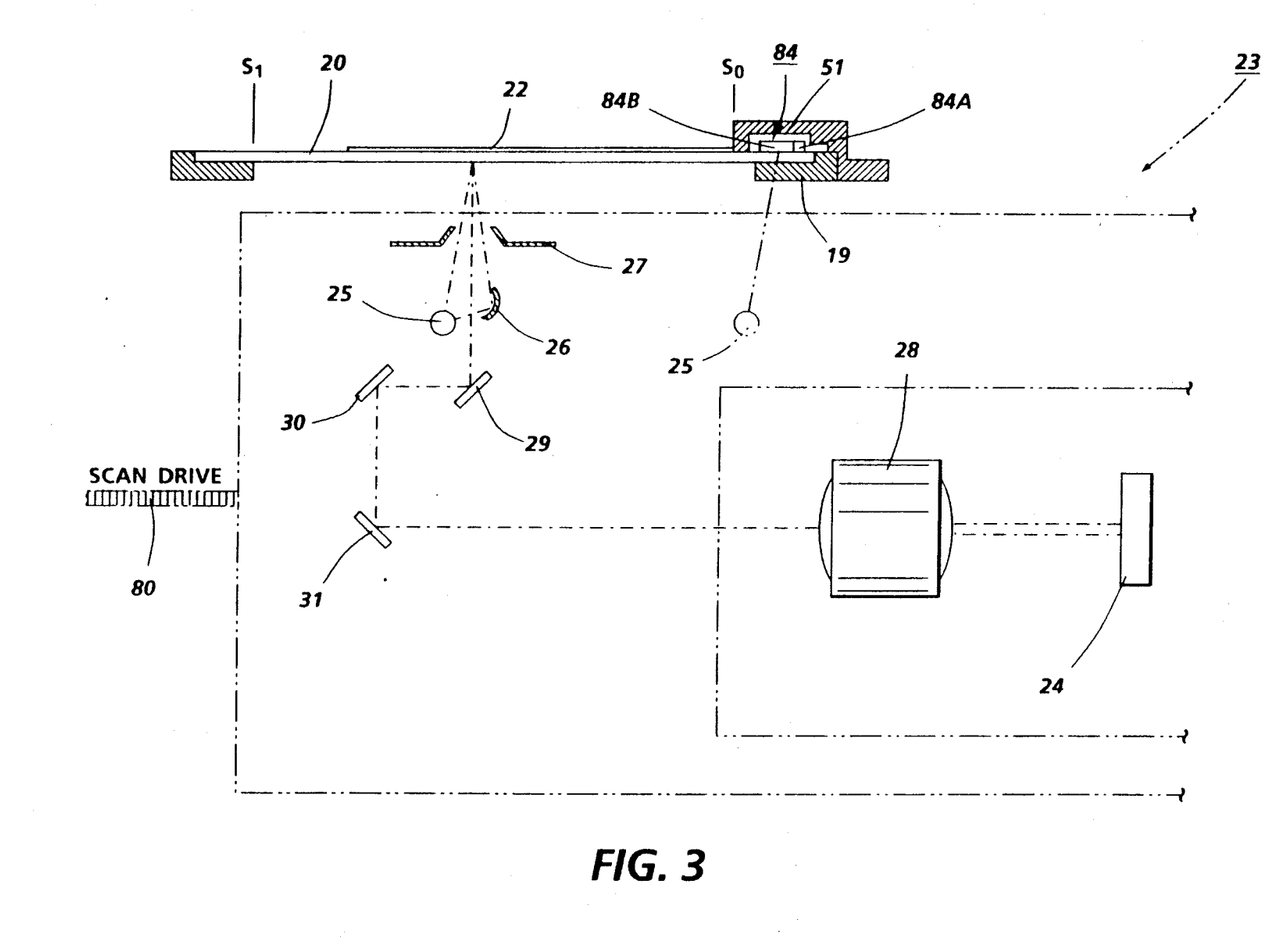
FIG. 3 is an enlarged schematic view of the RIS scanning system for the printing system shown in FIG. 1.

Referring particularly to FIGS. 2 and 3, scanner section 6 incorporates a transparent platen 20 on which a document 22 to be copied is located. One or more linear arrays 24 are supported for reciprocating scanning movement below platen 20. An optical assembly 23 comprises a plurality of optical components which move together as a single unit. The components include a linear, fluorescent lamp 25, associated reflector 26, and baffle 27, the later two elements cooperating to direct a narrow band of light onto an incremental area of the platen. Also included in assembly 23 are a lens 28, and mirrors 29,30, and 31, which cooperate to focus the illuminated line-like segment of platen 20 and the document being scanned thereon, onto array 24. Array 24 produces image signals or pixels representative of the image scanned which, after suitable processing by processor 34, are output to controller section 7. The document is registered against the edge of registration guide 51, and scanning takes place from start of scan position $S_0$ to end of scan position $S_1$. Located beneath guide 51 is a calibration reference strip 84 also extending along the platen width. Strip 84 has a first linear white segment 84A and a second linear black segment 84B. The utility of strip 84 is described below.

Output analog signals from array 24 are analog gain-/adjusted and converted to 8 bit gray level digital signals in AGC circuit 32 and sent to processor 34. Processor 34 converts the digital input signals to single bit digital output signals, normalizes and processes the digital image signals as required to enable system 2 to store and handle the image data in the form required to carry out the job programmed. Processor 34 also provides enhancements and changes to the image signals such as filtering, thresholding, screening, cropping, scaling, etc. Referring to FIG. 2, controller section 7 is, for explanation purposes, divided into an image input controller 50, user interface (UI) 52, system controller 54, main memory 56, image manipulation section 58, and image output controller 60. As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programing information and, most pertinent for purposes of the present application, diagnostic information on illumination conditions within the optical system. Items displayed on touchscreen 62 such as files and icons are actuated by either touching the displayed item on screen 62 with a finger or by using mouse 66 to pint cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent too image output controller 60. The scanned image data input from processor 34 of scanner section 6 is operated on by controller section 7. The output of controller 7 operates a Raster Output Scanner (ROS) 62 in printer section 8. ROS 62 incorporates a laser which generates output beams which are in turn scanned across a moving photoreceptor located in print module 64. Image lines are exposed at the photoreceptor with each scan cycle to create latent electrostatographic images. A further description of the exemplary printing system 2 is found in copending U.S. application Ser. No. 07/546,617 filed Jun. 29, 1990 whose contents are hereby incorporated by reference.

Figure 4:
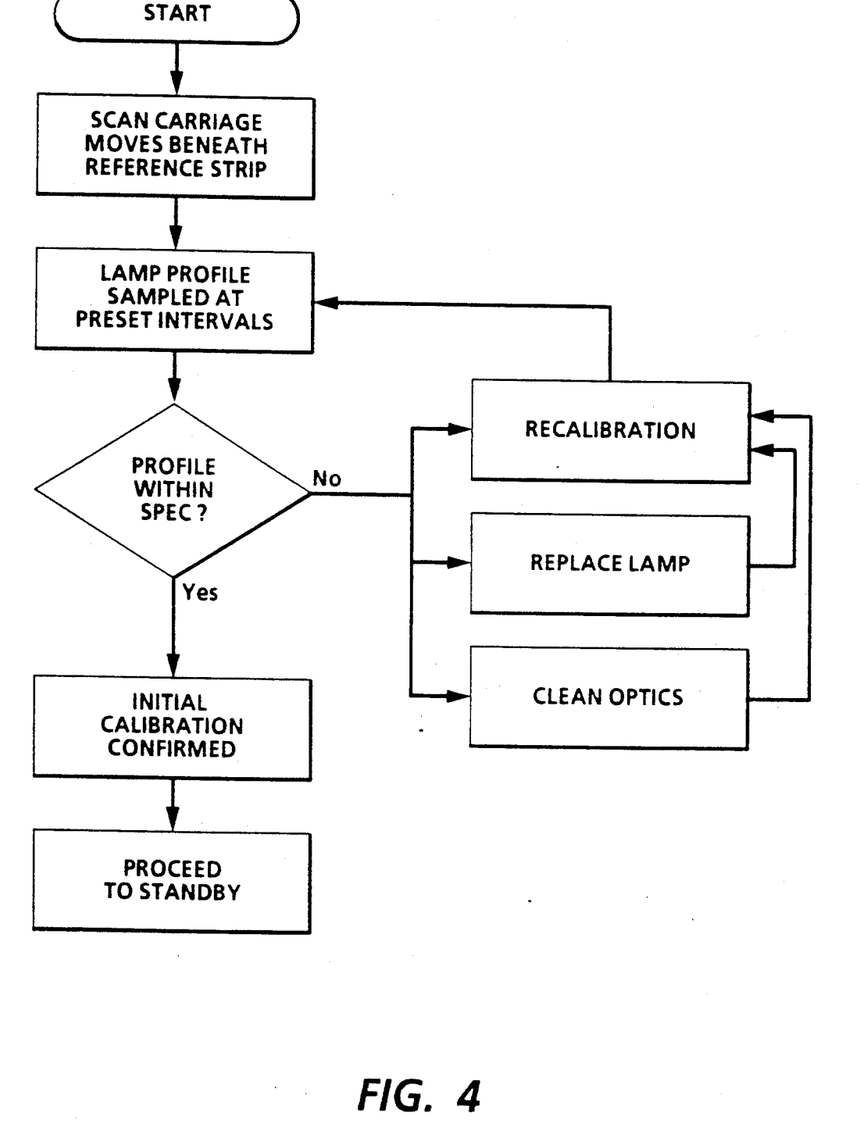
FIG. 4 is a flow chart of initial lamp calibration in a diagnostic mode of operation.
Figure 5:
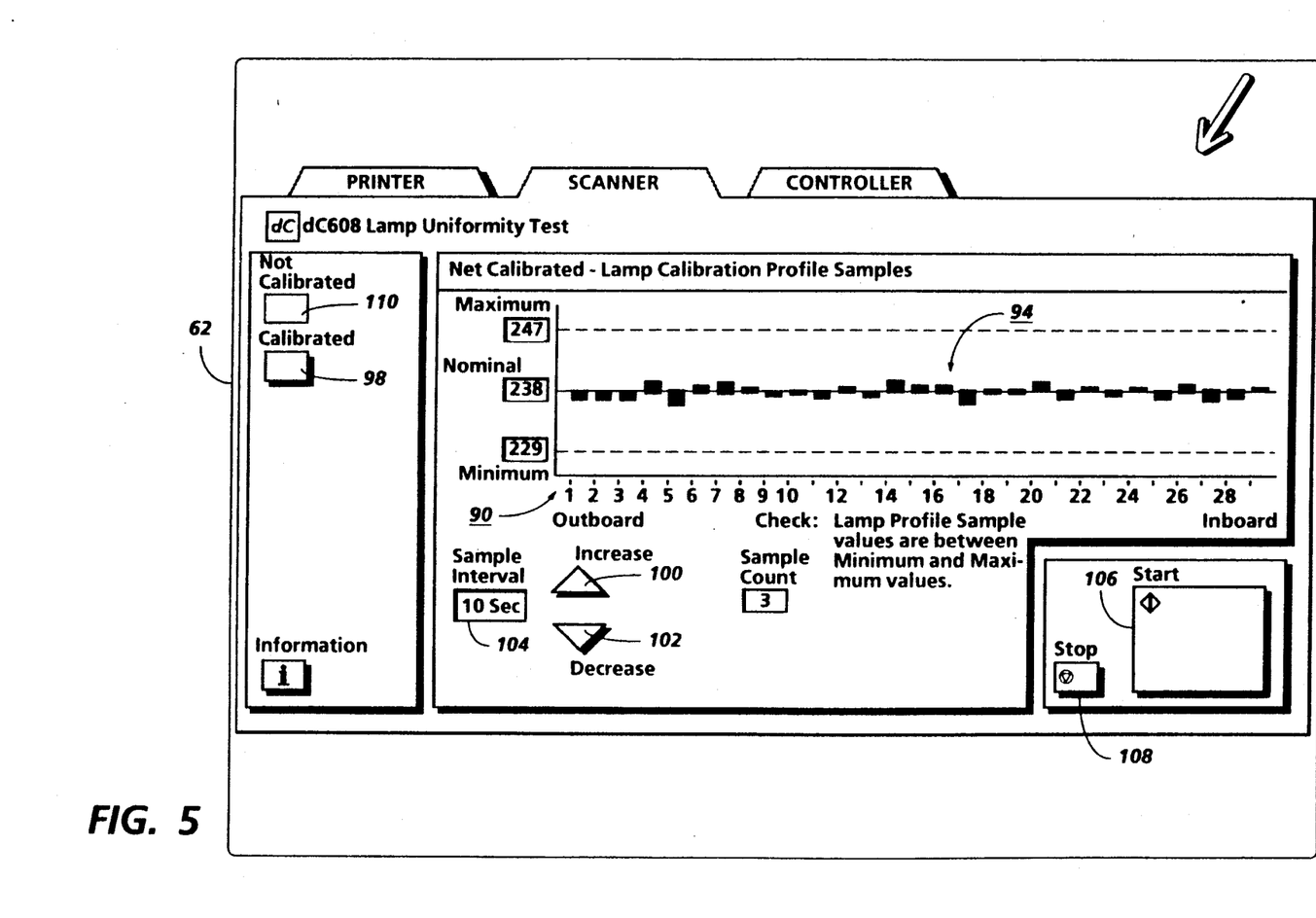
FIG. 5 shows the display screen for viewing the lamp illumination profile.

According to the present invention, the scanning system shown in FIG. 3 can also be operated in a diagnostic mode of operation to provide a visual display, in real time, of the illumination profile of lamp 25 at touchscreen 62. Based on operator or tech rep observations of the illumination profile, a determination can be made consistent with the steps shown in the flow chart of FIG. 4 that the lamp output is still within a preestablished specification (initial calibration is still valid) or that the lamp requires calibration or replacement or the optical system requires cleaning. See representation of this embodied algorithm for this process in Appendix A. Referring now to FIG. 5, touchscreen 62 displays a lamp specification grid 90 used to display an output profile having an indicia which show the output profile of the lamp along its length as measured against gray scale values associate with calibration specification. A typical profile 94 is shown comprises of a plurality of histogram bars 96 derived from procedures described below.

The diagnostic mode is entered by the operator tech rep touching the CALIBRATED switch 98, selecting a sampling time between display profiles by pressing the "INCREASE and DECREASE" switches 100, 102 until the desired SAMPLE INTERVAL is displayed in display 104. The START SWITCH 106 is then depressed, initiating the sequence of events showing the flow chart of FIG. 4. Optical assembly 23 (FIG. 3) is moved by scan drive 80 to the right until lamp 25 is located beneath the reference strip 84A (shown in dotted from in FIG. 3). The lamp positioning vis-a-vis reference strip is enabled in the manner disclosed in copending in U.S. Ser. No. 07/573,825 filed Aug. 28, 1990 assigned to the same assignee as the present invention and whose contents are hereby incorporated by reference. Lamp 25 is energized and a lamp output illumination profile sampled at the preset intervals selected at screen 62. For this example, a ten second interval has been selected. Thus, every ten seconds, the lamp output reflected from reference strip 84A is projected by lens 28 onto an array 24. Outputs from a number of discrete locations in array 24 are sent to AGC circuit 32 where the analog to digital conversation is accomplished. For this example, 29 discrete samples are taken, each sample consisting of 64 pixels. The output from circuit 32 is sent to processor 34 as an 8 bit digital data signal. Further image processing is accomplished in processor 34, which provides the video signals which are sent to controller 7. Under system control 54, the signals are sent to user interface 52 which contains the software for providing the graphic display interface with touchscreen 62. The video signals are also, at this point, converted into signals representing the histogram bars forming profile 94.

Continuing with the description, once the START switch has been depressed, every ten seconds a profile 94 of the particular sample is displayed on the screen. A visual determination is made after several saplings as to whether or not the lamp is still within initial calibration. It is assembled that the initial lamp calibration has established a nominal value of 238 gray levels as the maximum reflection from strip 84A and further, that a variation of ±4% has been established as a tolerable out of spec variation. Thus an operator tech rep will observe the sequentially refreshed video display to see whether the profiles' upper or lower levels stay within the 247 to 229 range, respectively. If the lamp calibration is confirmed as being within specification, the STOP switch 108 is touched and the system is returned to standby operation. If the lamp profile exceeds the maximum/minimum range, the tech rep will touch the SCANNER segment of the screen to go to the next higher protocol where a recalibration sequence can be initiated. This lamp recalibration is effected with the procedure set forth in copending application U.S. Ser. No. 07/590,426 filed Sep. 28, 1990 the same assignee as the present invention, and whose contents are hereby incorporated by reference.

The tech rep has additional options depending upon his "reading" of the display profiles. He or she may elect to examine the lamp profile in an uncalibrated mode by touching the NOT-CALIBRATED switch 110. This changes the reading of grid 90 to display a coarser nominal gray level of 192 and a 128 to 255 as the lower and upper levels of the response. The samples are then viewed to determine whether the variation in the lamp outputs are symptomatic of lamp aging or possibly contamination somewhere in the optical system resulting in the light variations being displayed. The optic shown in FIG. 4 are to replace the lamp and recalibrate or to clean the optics. The tech rep may elect either of these options without recourse to the "noncalibrated" mode.

According to further aspects of the present invention, the video sampling technique can be used for other purposes than to verify the lamp illumination. For example, the initial positioning of the scanned carriage components, vis-a-vis the platen, can be verified by checking that the lamp is exactly parallel with the plane of the object plane. Non-parallelism would be represented by variations in the light profile and can be compensated for by changing the gains of the photosites of the photosensor. These diagnostic procedures can also be used as a densitometer tool. For example, density variations between two originals having varying backgrounds, can be verified by sequentially displaying the lamp profiles reflected from each document.

While the invention has been described with reference to the structure disclosed, it will be appreciated that numerous changes and modifications are likely to occur to those skilled in the art. For example, additional system tests may be used at initial setup to display spatial information on the uniformly the calibration strip or any other target, as well as gray scale response of the lamp. And, while the example given is for a diagnostic tool in the scanner section of an electronic reprographic system, the invention may also find utility in scanners used, for example, in desk top printing applications where the scanners are coupled to a host computer.

APPENDIX A

```
DC99CmdCnt: Procedure(Ptr);

/*-------------------------------------------------------------------
    This routine will control the Lamp Profile Diagnostic associated with
    Calibration
------------------------------------------------------------------*/

Declare Ptr        Address;
Declare DiagMsg based Ptr ClientMessage;

If DiagMsg.Info(01) = 05
Then Do; /* Start */
    If (Standby AND NOT(DC99Running))  /* DC Start */
    Then Do;
        SlowProfile = False;

If DiagMsg.Info(2) > 0
        Then Do;
            MaxSlow = DiagMsg.Info(2);
            SlowProfile = True;
        End;
```

```
If (DiagMsg.Info(3) < 5)
Then Do;
  If UnCorrected
  Then Call FlagSAOutMsgRdy( (04,85H,0FH,08,0F2H));
  Else Call FlagSAOutMsgRdy( (04,85H,0CH,08,0F2H));
  End;

Else If (DiagMsg.Info(3) > 29)

Then Do;
    If UnCorrected
    Then Call FlagSAOutMsgRdy(.(04,85H,0FH,08,0F3H));
    Else Call FlagSAOutMsgRdy(.(04,85H,0CH,08,0F3H));
    End;

Else If (DiagMsg.Info(4) = 0)
  Then Do;
    If UnCorrected
    Then Call FlagSAOutMsgRdy(.(04,85H,0FH,08,0F4H));
    Else Call FlagSAOutMsgRdy(.(04,85H,0CH,08,0F4H));
    End;

Else Do;
  LampSamples = DiagMsg.Info(3);

If UnCorrected /* Don't apply calibration corrections */
  Then Call GainSave;

SampleTime = (DiagMsg.Info(4) * 100);
  DC99Running = True;
  HoldUp = 0;
  FirstTime = True;
  Call TrapSync;

DiagMsg.Info(0) = 02; /* DC16 Start for MCB */
  Call FlagPAOutMsgRdy(.DiagMsg);

DiagMsg.ID = 85H;
```

```
   If UnCorrected
   Then DiagMsg.Info(0) = 0FH;
   Else DiagMsg.Info(0) = 0CH;

Call FlagSAOutMsgRdy(.DiagMsg);

DiagMsg.Count   = 10;
     DiagMsg.Info(1) = 04;
     DiagMsg.Info(2) = 01;
     DiagMsg.Info(3) = 00;
     DiagMsg.Info(4) = 00;
     DiagMsg.Info(5) = 03;

If UnCorrected
     Then Do;
       DiagMsg.Info(6) = 192;
       DiagMsg.Info(7) = 128;
       DiagMsg.Info(8) = 255;
       End;

Else Do;
       DiagMsg.Info(6) = IPMNVM.WhiteReflct;
       DiagMsg.Info(7) = IPMNVM.WhiteReflct - Deviation;
       DiagMsg.Info(8) = IPMNVM.WhiteReflct + Deviation;
       End;

Call FlagSAOutMsgRdy(.DiagMsg);
     GenTimer = 0;
     End;
   End;

Else Call CantDoIt(DiagMsg.Info(0));
   End; /* Start */

Else If DiagMsg.Info(01) = 06
   Then Do; /* Stop */
```

```
If DC99Running /* DC Stop */
Then Do;
   HoldUp = 0;
   DiagMsg.Info(0) = 02; /* DC16 Stop for MCB */
   Call FlagPAOutMsgRdy(.DiagMsg);

SlowProfile = False;

If UnCorrected /* Don't apply calibration corrections */
   Then Call GainRestore;

Call LetSyncGo;
   Call LoadHdwr;
   DiagMsg.ID = 85H;

If UnCorrected
   Then Do;
      UnCorrected = False;
      DiagMsg.Info(0) = 0FH;
      End;

Else DiagMsg.Info(0) = 0CH;

Call FlagSAOutMsgRdy(.DiagMsg);
   End;

Else Call CantDoIt(DiagMsg.Info(0));
End; /* Stop */

Else Do;
   If UnCorrected
   Then Call CantDoIt(0FH);
   Else Call CantDoIt(0CH);

End DC99CmdCnt;
```

```
CalWait: Procedure Public;
/*----------------------------------------------------------------
------------------------------------------------------------------*/

Declare Spot   Byte;
Declare Pos    Byte;

If GenTimer > IPMNVM.LampTimeOut /* Max time out for lamp stability */
Then Do;
   GenTimer = 0;
   Call FaultTableUpdate(14,0CEH);
   Call DiagPrompt(0F6H,01,00); /* Lamp profile failed in allowed time */
   CalibrationStep = 02; /* Proceed with the calibration anyway */
   NewLineReceived = False;
   End;

Else If NewLineReceived
   Then Do;
      NewLineReceived = False;

Call LampProfile; /* Get a scan line of data */

LampProfile: Procedure Public;
/*------------------------------------------------------------------
   This is executed on VIDEO PAGE 1 RAM monitoring lamp profile stability
------------------------------------------------------------------*/

Declare LampPos Byte;
Declare Overall Address;

LampPos, Overall = 0;

Do Counter1 = 20H to 720H by (700H / (LampSamples - 01));
   Call PagetoVideo;
/****************** Video RAM ********************/
   AvgPlc = BegStorageRAM2 + Counter1;

Call Avg64;

;Date 04 May 87
;This procedure takes the average of sixty four numbers.
;Register usage:
;HL : pointer to the pixel location
;C  : used as a loop counter
;DE : accumulates sum Avg64:  LHLD AvgPlc   ; load address first pixel location
        MOV  E,M      ; read the byte pointed to by HL, store in E
        MVI  D,00     ; clear the MSB of DE
        XRA  A        ; clear carry flag
        MVI  C,63     ; initialize the loop counter
```

```
Loop64: INX  H       ; move pointer to next address
    MOV  A,M     ; move the byte to A
    ADD  E       ; add the values together
    MOV  E,A     ; save the value in E
    JNC  Cary64  ; if the carry bit isn't set, read another byte
    INR  D       ; increment D because there was a carry
Cary64: DCR  C   ; decrement the loop count
    JNZ  Loop64  ; if it isn't zero, read another value ;Now DE contains the sum of 64 numbers. Divide it by 64.
    MVI  C,06    ; initialize the loop counter
Div64: XRA  A    ; clear carry flag
    MOV  A,D     ; move MSB to A
    RAR          ; divide by 2 & set carry flag
    MOV  D,A     ; restore the byte
    MOV  A,E     ; move LSB to A
    RAR          ; divide by 2 & set carry flag
    MOV  E,A     ; restore the byte
    DCR  C       ; decrement the loop count
    JNZ  Div64   ; if it isn't zero, divide again
    MOV  A,E     ; restore the byte
    STA  AvgPrf  ; store the sum as AvgPrf
    RET Call PagetoCode;
/***************** Code RAM *****************/

LampArea(LampPos) = AvgPrf; /* Stuff Array element */
    Overall = Overall + AvgPrf; /* Update running average */
    LampPos = LampPos + 1;
    AvgPrf = 0;
    End;

RunningAvg = (Overall / LampSamples);
LampArea(LampPos) = RunningAvg;

VideoInfo = True;

End LampProfile;

End CalWait;

ProfileControl: Procedure;
/*------------------------------------------------------------
------------------------------------------------------------*/

If VideoInfo
Then Call ProfileUpDate;

ProfileUpDate: Procedure;
/*------------------------------------------------------------
------------------------------------------------------------*/
Declare ReportSamples   Byte;
```

```
VideoInfo = False;
ReportSamples = LampSamples + 01; /* add 1 additional for average
reporting */

Report.Count = ReportSamples + 07;
Report.ID = 85H;

If UnCorrected
Then Report.Info(0) = 0FH;
Else Report.Info(0) = 0CH;

Report.Info(1) = 04;
Report.Info(2) = 01;
Report.Info(3) = 00;
Report.Info(4) = 00;
Report.Info(5) = ReportSamples;

Call Move(ReportSamples,.LampArea(0),.Report.Info(6));

If DC99Running
Then Do;
   If HoldUp > 02
   Then Call FlagSAOutMsgRdy(.Report);
   Else HoldUp = HoldUp + 01;
   End;

End ProfileUpDate;

Else Do;
   If (FirstTime AND (GenTimer > 1000))

Then Do;
      FirstTime = False;
      GenTimer = 0;
      Call FlagPAOutMsgRdy(.(04,05,02,07,02));
      End;

Else If (NOT(FirstTime) AND (GenTimer > SampleTime))
   Then Do;
      GenTimer = 0;

If SlowProfile
      Then Do;
         If Indent < MaxSlow
         Then Do;
            Call FlagPAOutMsgRdy(.(04,05,02,07,02));
            Indent = Indent + 1;
            End;

Else SlowProfile = False;
         End;

Else Call FlagPAOutMsgRdy(.(04,05,02,07,03));
      End;
   End;

End   ProfileControl;
```

We claim:

1. A diagnostic method for visually checking that the scan illumination lamp in a raster input scanner (RIS) is within preset calibration specifications, including the steps of
   operating said RIS in a diagnostic mode of operation to illuminate a lamp calibration strip at preset time intervals and image the reflected light onto a photosensor array,
   sampling the output of said photosensor array at a plurality of discrete locations,
   converting the output signals generated by said sampling of the photosensor array into digital video signals representative of the illumination output profile of the lamp, and
   displaying the video signals so as to provide a visual indication of whether the output profile is maintained within said preset calibration specifications.

2. The method of claim 1, further including the step of recalibrating the lamp if an out of specification condition is displayed.

3. The method of claim 1, further including the step of replacing the lamp if an out of specification is noted.

4. The method of claim 1, further including the step of cleaning the optical elements associated the RIS scanner if an out of specification condition is noted.

5. An electronic printing system including in combination:
   scanning means for incrementally scanning, in a document scanning mode, a document located in a object plane and exposing a photosensor array so as to provide output image signals representative of the document scanned, said scanning means including, as an illumination source, a linear lamp having a characteristic output illumination profile along its length, said scanning means adapted to operate in a diagnostic mode of operation to scan a calibration test strip and expose the photosensor array at preset time intervals so as form output image signals representative of the illumination profile of said lamp along its length,
   a display screen adapted to provide a visual representation of the lamp illumination profiles represented by said video display signals, and
   control means for sampling the output of said photosensor array at a plurality of discrete locations and for converting the signals generated by said sampling into digital video display signals for display on said display screen.

6. The printing system of claim 5 wherein said display screen includes a lamp specification grid which enables a visual check to determine whether the lamp output profiled is maintained within a given variance compared to a nominal gray level value, other the sampling time period.

7. The printing system of claim 5, further including means displaying the illumination profile in the calibrated or uncalibrated (coarse) mode.

8. The printing system of claim 5 wherein said video signals are displayed as histogram bars on said screen.

9. An electronic reprographic printing system comprising:
   a raster input scanner (RIS) adapted to scan, at preset time intervals, a reference strip in an object plane with a geometrically linear lamp and to focus light from the strip onto a linear photosensor array, the detected light representing the output illumination profile of the lamp during said scan time interval,
   display means enabled in a lamp diagnostic mode, and
   control means for controlling the scanning and display means and photosensor array, said control means including means for converting the output of said photosensor array into a real time visual display on said display means of the lamp output illumination profile, said control means further adapted to provide a sequential series of samples of the detected illumination profile whether corresponding visual displays of each sample profile are sequentially displayed on said display means.

10. The system of claim 9 wherein said displayed illumination profiles are displayed along a specification grid incorporating indicia for detecting whether a profile maximum or minimum is maintained within a predetermined calibration variation range over the sampled time period.

* * * * *